US009557965B2

(12) United States Patent
Santos Luaces

(10) Patent No.: US 9,557,965 B2
(45) Date of Patent: Jan. 31, 2017

(54) METHOD FOR PROGRAMMING LANGUAGE DEPENDENT MERGING OF PROGRAM CODES

(71) Applicant: Codice Software, S.L., Boecillo, Valladoid (ES)

(72) Inventor: Pablo Santos Luaces, Boecillo (ES)

(73) Assignee: Codice Software, S.L., Boecillo, Valladolid (ES)

( * ) Notice: Subject to any disclaimer, the term of this patent is extended or adjusted under 35 U.S.C. 154(b) by 0 days.

(21) Appl. No.: 14/181,846

(22) Filed: Feb. 17, 2014

(65) Prior Publication Data
US 2014/0237447 A1 Aug. 21, 2014

(30) Foreign Application Priority Data

Feb. 19, 2013 (EP) ...................................... 13155704

(51) Int. Cl.
G06F 9/44 (2006.01)
(52) U.S. Cl.
CPC .. G06F 8/30 (2013.01); G06F 8/71 (2013.01)
(58) Field of Classification Search
CPC ...................................... G06F 8/30; G06F 8/71
See application file for complete search history.

(56) References Cited

U.S. PATENT DOCUMENTS

2003/0084424 A1* 5/2003 Reddy et al. .................. 717/105
2006/0225040 A1* 10/2006 Waddington .................. 717/122
2010/0088676 A1* 4/2010 Yuan ................. G06F 17/30908
717/120

FOREIGN PATENT DOCUMENTS

EP 2 390 793 A1 11/2011

OTHER PUBLICATIONS

Jim Buffenbarger, "Syntactic software merging", Jun. 7, 2005,Boise State University.*

(Continued)

Primary Examiner — Li B Zhen
Assistant Examiner — Amir Soltanzadeh
(74) Attorney, Agent, or Firm — Polsinelli PC

(57) ABSTRACT

Method for merging a program code and a first and second modified program code comprising: determining a first and second data structure difference between the data structure of the program code and the data structure of the first and second modified program code by comparing items $X_i$ in the data structure of the program code with items $Y_j$ in the data structure of the first modified program code and with items $Z_j$ in the data structure of the second modified program code and identifying items $Y_m'$ for which no equivalent in the data structure of the program code can be identified, the first data structure difference comprising the items $Y_m'$ and the second data structure difference comprising items $Z_k'$; generating a merged difference data structure from the first and second data structure difference and applying the merged difference data structure to the program code to generate a final program code.

23 Claims, 7 Drawing Sheets

(56) References Cited

OTHER PUBLICATIONS

Wuu et al.: "How to mege program texts", Journal of Systems & Software, Elsevier North Holland, New York, NY, US, vol. 27, No. 2, Nov. 1994, pp. 129-135.
Tom Mens: "A State-Of-The-Art Survey on Software Merging", IEEE Transactions on Software Engineering, IEEE Service Center, Los Alamitos, CA, US, vol. 28, No. 5, May 2002, pp. 449-462.
European Search Report dated Jun. 18, 2013, issued in corresponding European Application No. 13 15 5704.

* cited by examiner

METHOD FOR PROGRAMMING LANGUAGE DEPENDENT MERGING OF PROGRAM CODES

CROSS-REFERENCE TO RELATED APPLICATIONS

This application claims the benefit of European Application No. 13 155 704.3, filed Feb. 19, 2013, in the European Patent Office, the disclosure of which is incorporated herein by reference.

BACKGROUND OF THE INVENTION

1. Field of the Invention

The invention is related to a method for combining program codes or parts of program codes in a programming language dependent way.

2. Description of the Related Art

Comparing texts or text portions in order to identify changes that were applied in a text portion compared to another text portion are widely known.

For example, European patent 1 000 5512 discloses a method for determining similarities of text portions. This method allows for comparing lines of a first text portion to lines in a second text portion by using a modified Levenshtein algorithm in order to determine whether or not some words in a first line of a first test portion are also included in a second line of a second text portion. Thereby, it can be determined whether text of a second text portion is included, or can be considered to be included, in a first text portion. The method according to EP 1 000 5512, therefore, relies on comparing the words of a line in the first text portion to words of another line in a second text portion.

It is also known to compare each and every sign of a first line in a first text portion to a second line in a second text portion in order to determine whether the first line of the first text portion can be considered to be included in the second line of the second text portion. These algorithms have the advantage of working independently of the programming language.

While such methods work very well in view of comparing a first and a second text portion with each other, they might not always be suitable for comparing text written for program code, since these texts or their meaning also depend on syntax and semantic. Therefore, the problem which is to be solved by the present invention is to provide a method for merging a first modified program code and a second modified program code, that were derived from a program code, in a more effective way.

SUMMARY OF THE INVENTION

The method according to the invention comprises the steps of determining from each of the program code, the first modified program code and the second modified program code that comprise one or more items, wherein the items are items of a specific programming language, a respective data structure by programming language dependent parsing of the program code, the first modified program code and the second modified program code, thereby obtaining syntax information of the program code and the first and second modified program code. Further, the method comprises the step of determining a first data structure difference between the data structure of the program code and the data structure of the first modified program code by comparing items $X_i$ in the data structure of the program code with items $Y_j$ in the data structure of the first modified program code and identifying items $Y_m'$, for which no equivalent in the data structure of the program code can be identified, the first data structure difference comprising the items $Y_m'$. Similarly, a second data structure difference is determined between the data structure of the program code and the data structure of the second modified program code by comparing items $X_i$ in the data structure of the program code with items $Z_j$ in the data structure of the second modified program code and identifying items $Z_k'$, for which no equivalent in the data structure of the program code can be identified, the second data structure difference comprising the items $Z_k'$. Moreover, the method comprises generating a final program code by including at least one of the items $Y_m'$ and/or $Z_k'$ in the program code. By obtaining data structures that include the differences applied to the program code in the first modified program code and the second modified program code, by applying programming language dependent parsing, the syntax information can be obtained from the program code, the first modified program code, and the second modified program code. This syntax information is used to identify changes that were applied in the first or second modified program code, compared to the program code, that indeed have influence on the program code in a programming language specific way. Further, this method allows for generating a final program code that takes into account these changes.

Further, the method may comprise the step of identifying, by programming language dependent comparing the first data structure difference with the second data structure difference, modified items $A_i$ in the first modified program code that results in conflicts with modified items $B_j$ in the second modified program code. By identifying conflicts that would result from combining specific items of the first modified program code and the second modified program code, problems that may occur can be identified.

In a further embodiment, the method comprises the step of generating a merged difference data structure by merging the first data structure difference and the second data structure difference and excluding, from the merged difference data structure, the modified items $A_i$. By generating such a merged difference data structure that excludes the modified items $A_i$, that would result in conflicts, it is possible to avoid such conflicts even before generating the final program code.

Further, the step of generating a final program code can comprise applying pseudo program code corresponding to the merged difference data structure to the program code. By applying such pseudo program code to the program code in order to generate the final program code, it can be assured that, at least, no conflicts are included in the final program code that would result from including the items $A_i$.

In a further embodiment, the method is characterized in that at least one of the items of a specific programming language is a function.

In a further embodiment, incorporating the pseudo program code is carried out in accordance with the syntax information. By applying such pseudo program code, which itself may not have any structure that would result in a working program, in accordance with syntax information, a final program code that can be carried out without causing further conflicts with respect to the already identified items $A_i$ can be generated.

Further, the method may comprise the step of outputting information on at least one of added items, moved items, deleted items and modified items of the first and second modified program code compared to the program code. Such output of information may be advantageous since a user may study this information and correct errors that may have occurred during generation of the data structures or of the final code.

In another embodiment, the conflicts comprise at least one of position-related conflicts and name-related conflicts.

Further, the step of determining the data structures may comprise handling a source code of the function as text. This means that the source code of the function, and especially the body of the function, can be handled without having any influence on the syntax of the whole program. By only concentrating on the relationship of the functions, and not on the contents of the functions, information that is not relevant for the syntax of a program code can be discarded when determining the data structures.

In a further embodiment, determining the data structures comprises excluding the body of the source code of the functions from the data structures. This also results in discarding, for the determination of the data structures, information that is not related to the syntax information and, further, if the data structures are provided to a user, may allow the user to clearly identify the syntax correlations of the item without having to consider the non-syntax related contents of the items.

The method may be further characterized in that items $J_i$ that are moved in at least one of the first and second modified program code, are considered to have an equivalent in the data structure of the program code if they are moved within a scope, and are considered to have no equivalent in the program code if they are moved outside the scope. The scope is a structure that is language dependent. Herein, scope is considered as all parts of the source code that belong to a specific item, for example a function or a class due to their arrangement within another item, the complete program code. Therefore, shifting of items, for example functions, within for example a class or the scope defined by this item (class) respectively, will not be considered as representing a difference concerning the scope i.e. compared to the original program code since this has no influence on the syntax of the program code, whereas moving a function out of a class into another class, and hence, another scope respectively, may cause conflicts, or at least may have an influence on the syntax of the program code.

Further, the step of generating the final program code may comprise applying semantic heuristics, depending on the programming language to which the program code and the first and second modified program codes correspond, and depending on the items included in the program code and the first and second modified program codes. Applying such heuristics may help in identifying, or at least determining a likelihood that a change that was applied in one of the first and second modified program codes indeed results in a change of the syntax of the program code and, therefore, may cause conflicts if information on the behavior of such changes is know.

In another embodiment, the data structures further comprise information on the position of items of the program code and the first and second modified program code, respectively. Providing such information will make it easier for a user to identify changes and to identify where these changes originated from.

DETAILED DESCRIPTION OF THE EMBODIMENTS

Figure 1:
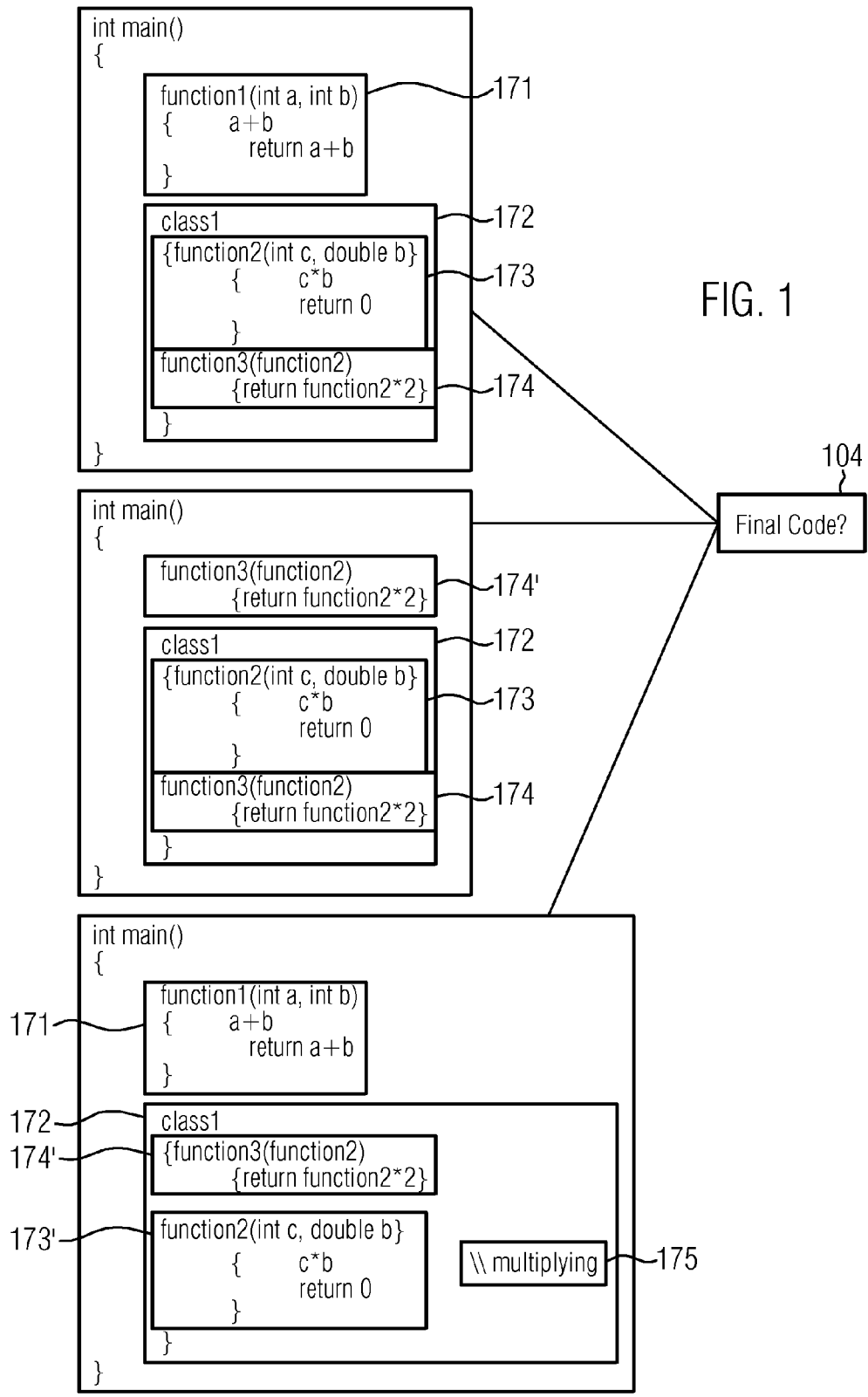
FIG. 1 is a depiction of three program codes

FIG. 1 depicts three program codes 101, 102, and 103. It is noted, that the "program" codes shown in FIG. 1, and throughout the whole application, do not refer to a specific programming language unless otherwise indicated. For illustrative purposes only, a "pseudo programming language" is used to show the relevant features.

In the example shown in FIG. 1, the program codes 101 and 102 are the first and second modified program codes 101 and 102, respectively. These program codes were generated by applying changes to the program code 103. Such different program codes normally occur, for example, if more than one person work together to create a final program code from the original program code 103. In case, modified program codes are generated by each user in order to create the final program code, concurrent changes can occur in the modified program codes 101 and 102.

This is, for example, whereas the program code 103, which is the original program code from which the first modified program code 101 and the second modified program code 102 are derived, comprises a function 171 and a class 172, wherein the class comprises two further functions, the first modified program code and the second modified program code 101 and 102, respectively, are different from this program code 103. In detail, the first modified program code 101 may differ from the program code 103 in that the function1, 171, was replaced with function3, 174'. The class 172 remains the same, i.e. it includes the same functions 172 and 174 as the program codes 103. The second modified program code 102, on the other hand, includes the same function 171 and class 172, although in class 172 function2 and function3 were shifted such that they now correspond to changed functions 174' and 173', respectively. Further, a comment 175 may have been added to the class 172.

As it is the intention to generate one final program code, it is necessary to combine the modified program codes 101 and 102, respectively, such that one final program code 104 is generated. This, however, cannot be achieved in a straight forward way by just comparing each line of the first modified program code 101 and the second modified program code 102 and applying the resulting changes. This is because items in program code, like the functions and classes in program codes 101, 102, and 103 depicted in FIG. 1, define a specific syntax according to the used programming language. Most text comparison tools focus on comparing the text portions in view of the characters and signs used therein. This is, for example, a usual text comparison program would identify, as one difference between the first modified program code 101 and the second modified program code 102, the addition of the comment 175 in the second modified program code. Comments, however, do not have any influence on the function of a program, since the syntax of a program is independent of such comments. Further, such a text comparison program would identify the shift of functions 173' and 174' compared to the original program code 103 and the first modified program code 101, although shifting these functions within the class 172 does not influence the syntax of the program code at all. Therefore, it is necessary to identify changes applied to a program code 103 within modified program codes 101 and 102, which indeed have an influence on the syntax of the program code before generating a final program code 104.

In order to generate, from the first modified program code and the second modified program code, 101 and 102, a final program code 104, it may also be necessary to identify differences between the program code 103 and the first modified program code 101, as well as the program code 103 and the second modified program code 102, and determining whether changes applied in the second modified program code 102 and changes applied in the first modified program code 101 contradict each other, or are similar to each other, although being carried out differently, in order to generate the final code 104.

In order to achieve this, the invention provides a method that identifies differences that have an influence on the syntax of a program code in a first modified program code 101 and a second modified program code 102 and applies changes to the program code 103 in order to generate the final code 104 based on the identified changes with respect to the syntax. This approach already differs from usual and widely known text comparison methods.

Figure 2:
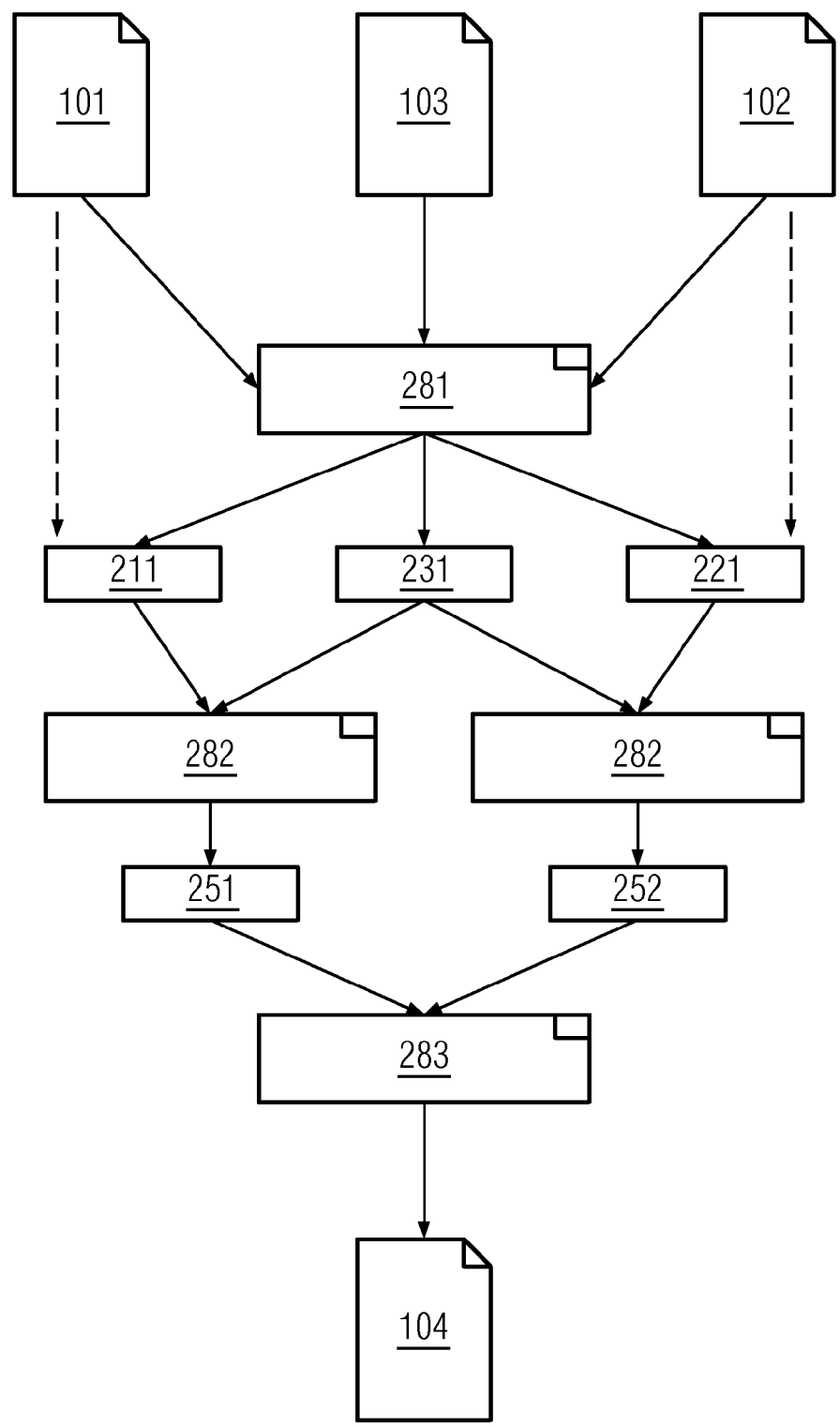
FIG. 2 is a block diagram of the method according to one embodiment of the invention

FIG. 2 depicts this method for automatically merging the changes applied to the first modified program code 101 of a program code 103 and a second modified program code 101 of the program codes 103.

In a first step, the program code 103 and the first and second modified program codes 101 and 102 are parsed 281 by a parsing unit. By parsing 281 the program codes 101, 102, and 103, a data structure for each of them is determined. In order to allow for determining differences of the program codes 101, 102, and 103, this parsing is carried out in a programming language dependent way. This means that, for each programming language that may be used, this parsing process may differ, i.e. a different parsing unit may have to be used or the parsing unit may have to be modified. This is because, for example, C++ and Fortran have different syntaxes and, therefore, applying the same parsing algorithm to a program code provided in C++, or to program codes provided in Fortran, would lead to conflicts.

More specifically, the parsing unit parses the program code by, on one side, looking for language dependent keywords or symbols that do provide information on an item in a clearly defined way. This means, for example in C++, the parsing unit will identify keywords like "int" or "double" as they identify specific item within a program that have influence on the syntax. Moreover, in order to for example establish the scope of a given item that was identified, the parsing unit will identify curved brackets "{" and "}" in order to identify the scope of this item. Also, normal brackets "(" and ")" will be identified if belonging to the definition of an item.

More precisely, in the following example using C++ program code

```
int examplefunction(int a, int b)
{
int c= a+b;
return c;
}
``` the parsing unit will identify the introduction of a new program item called examplefunction which is a function, since the parsing unit will identify the keyword int and the declarative structure by defining examplefunction as depending on 2 further items int a and int b. Further, by identifying the brackets "{" and "}" the parsing unit is able to identify the body of the function and the scope of the function, which in C++ is given by the brackets "{" and "}". Further, the parsing unit will identify a and b as only being variables since, although they are introduced with the same keyword int they do not depend on any other value and they do not have a corresponding body. Although the above example is provided in the context of C++, the general concept of how the parsing unit obtains the syntax information becomes clear. By parsing the program code for language specific keywords that have a well defined meaning within the programming language, the parsing unit can obtain information on the items, for example introduced with such keywords, their name(s) defined in the program code, signs determining e.g. a scope of an item (such as brackets "{" and "}") and the syntax of the program as well as the relationship between items. For example, the information on the specific declaration of the items (names, or on which specific variables they depend) might be used as further indicators on the program structure and therefore the syntax of the program code. Hence, by taking into account, not only the characters from which the program code is built, but also language dependent, well defined keywords that are built from those characters, the parsing unit is capable of identifying the syntax of the program code. Also names defined by such characters in the program code are used for identifying the syntax of the program code as defined names and not only as a group of characters. Furthermore signs (e.g. brackets "{" and "}" or commas, semicolons, points, slashes, double slashes, asterisks, etc.) indicating a starting point and an endpoint of a scope of an item are used to determine the syntax of the program code.

By parsing the program codes 101, 102, and 103, data structure 211, corresponding to the first modified program code 101, data structure 221, corresponding to the second modified program code 102, and data structure 231, corresponding to the program code 103, are generated. These data structures 211, 221, and 231 provide syntax information of the program codes 101, 102, and 103. Such syntax information concerns the inner structure of the program with respect to dependencies of the functions and classes, or in a more general term items, of the program code to each other. It is therefore independent from parts of the program code 101, 102, or 103, respectively, that do not have any influence on the interrelation of the items of the program, for example comments or shifting of functions in the same scope, for example within a class, as described in FIG. 1.

It is to be noted, that the parsing unit may not only analyze the program codes in view of specific key words or symbols, but may also include any information that can be obtained from the program code and might be relevant in view of the syntax of the parsed program code.

These data structures can be used to determine 282 differences. Therefore, the data structure 231 corresponding to the program code 103 is compared to the data structure 211, corresponding to the first modified program code 101, and the data structure 221, corresponding to the second modified program code 102, respectively. In order to do so, the items $X_i$ of the data structure 231 are compared with the items $Y_j$ and $Z_j$ of the data structures 211 and 221, respectively. How this comparison is carried out will be described later with reference to FIG. 4. The results of this comparison, however, are data structure differences 251 and 252. Herein, the first data structure difference 251 corresponds to the differences between the data structure 211 and 231. These differences correspond to items $Y_m'$ that were identified in the data structure 211 as having no equivalent in the data structure 231. In the context of this application "no equivalent" means that, in view of the syntax of the program code 103 the first modified program code 101 comprises items, for example functions or classes $Y_m'$ such that the syntax, and therefore the data structure 211, cannot be matched with the data structure 231 of the program code 103. The data structure difference 251, therefore, comprises these items $Y_m'$. Correspondingly, the second data structure difference 252 is generated by comparing items $X_i$ in the data structure 231 with the items $Z_j$ in the data structure 221 of the second modified program code. The items $Z_k'$ having no equivalent in the data structure 231 of the program code 101 are identified and included in the second data structure difference 252.

As a result, the first data structure difference 251 represents changes applied in the first modified program code, with respect to the program code 103, that do have an influence on the syntax of the resulting program code. Accordingly, the second data structure difference 252 comprises items $Z_k'$ that have an influence on the syntax of the second modified program code 102 compared to the program code 103.

In order to obtain a final program code 104, the first data structure difference 251 and the second data structure difference 252, comprising the items $Y_m'$ and $Z_k'$, respectively, are merged together with the program code 103 in order to generate the final program code. Thus, a final program code 104 is generated from the program code 103 and the first and second modified program code 101 and 102, respectively, taking into account changes applied in the first and second modified program code 101 and 102, respectively, with respect to the syntax of the program codes. Hence, in one embodiment, changes that were applied to the first modified program code 101 and the second modified program code 102, that have no influence on the syntax of the resulting program code, will not influence the generation of the final program code 104 and will not result in changes being identified at all, since such non-syntax changes are of no interest for the final program code 104. However, changes applied to at least one of the modified program codes may nevertheless be adopted if necessary, for example comments.

It should be noted, that the described method is not limited to applying the first and second data structure difference 251 and 252 to the program code 103 in order to obtain the final program code 104. It is also possible to generate a data structure difference from the first and second modified program codes 101 and 102 indicating the differences of the second modified program code 102 compared to the first modified program code 101. This makes it possible to apply this difference data structure and the objects included therein to the first modified program code 101 or vice versa. Thereby only changes in the second modified program code 102 compared to the first modified program code 101 are included that are not already included in the first modified program code 101. Thereby, a final program code 104 can be obtained without having apply the identified changes to the original program code 103.

Figure 3A:
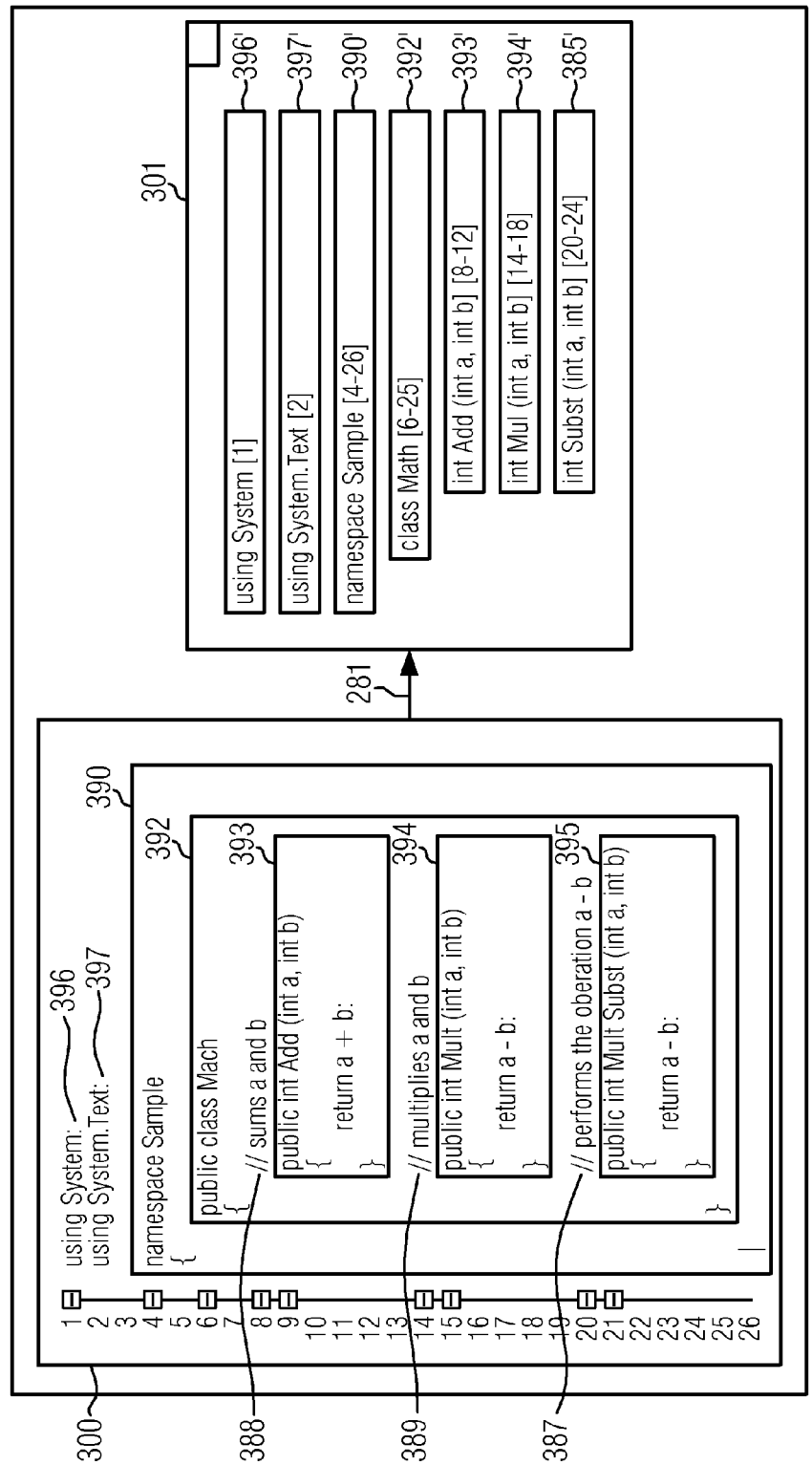
FIG. 3a is a depiction of program code compared to the corresponding data structure

FIG. 3a is a depiction of parsing step 281, described in FIG. 2 and represented by the arrow in FIG. 3a. The parsing process will be described here without reference to one of the specific program codes described above, i.e. the program code 103 and the first and second modified program codes 101 and 102, respectively.

The provided exemplary program code 300 comprises typical program code that may be implemented in a program code written in a suitable programming language. Although depicted here as a C# programming language, any other language may be suitable. The program code 300 includes headers 396 and 397 that are essential for the program code 300. Further, a namespace called sample 390 is provided that includes a public class called math 392 which comprises three functions 393, 394, and 395, as well as comments 387, 388, and 389. By parsing 281 the program code 300, a data structure 301 is generated that only comprises information relevant for the syntax of the program code 300. Therefore, the headers 396' and 397' are provided, as well as the namespace called sample 390'. Moreover, the class math 392' is provided as belonging to the namespace 390'. Furthermore, the three functions 393', 394', and 395' are provided as belonging to the class math 392'. Therefore, all the relevant information regarding the syntax of the program code is provided. It should be noted that the functions 393', 394', and 395' are parsed 281, not by maintaining their body, i.e. the operations that are carried out within the functions, but only maintaining the dependencies, i.e. that each of the functions depends of variables like int a and int b. This is because the body of the function, i.e. the explicit operations carried out in the function, is not of any importance with respect to the syntax information of the program code 300. The only thing that is relevant is on which variables these functions depend. Although, for example, if function 293' were to include in its function body that the value $$\frac{a+b}{2}$$

is returned instead of the value a+b, this would not have any influence on the dependencies of this function and other functions, although the result of carrying out this function in the program code may be a different one. In contrast thereto, it clearly would make a difference to the program code 300 if the function 393' were to depend from the variable int c instead of int a. The influence of specific modifications of program code will be described later in more detail.

As a general description, it is to be noted that it is possible to also obtain information from the body of function although this may not have an influence on the syntax of the program code. As an example, applying a modified Levenshtein algorithm to the bodies of functions that where identified is possible. A suitable Levenshtein algorithm is described in EP 10 005 512, which is incorporated in its entirety herewith. This allows for checking whether functions having the same name in the first and second modified program codes are indeed "the same functions". In order to check this, the result of the modified Levenshtein algorithm may be used to judge on whether the bodies of the functions are the same or not. In case they are not, the functions may be considered as different and it might be necessary to change their names such that no conflicts occur.

It should be noted that the data structure 301 also comprises the program lines depicted in square brackets. Although this information also has no influence on the syntax of the program code, it may be advantageous for a user in case the data structure 301 is provided in a viewable format.

Figure 3B:
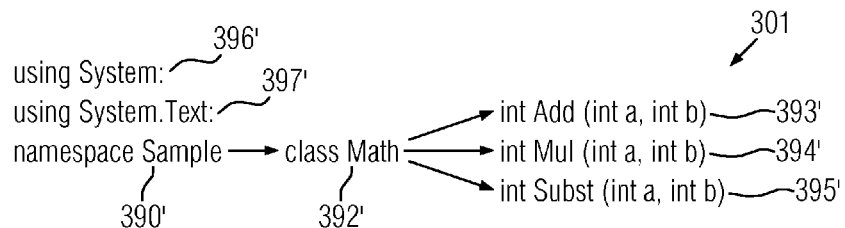
FIG. 3b is a further diagram showing one realization of a data structure difference according to one embodiment of the invention

The depicted illustration of the data structure 301, as can be found in FIG. 3a, is only one possible illustration. Other forms of expression are also possible. For example, FIG. 3b depicts the data structure 301 in the form of a tree structure. As can be seen clearly from FIG. 3b, the dependencies, and therefore the syntax, of the program is maintained and presented in a more suitable manner for viewing. In this embodiment, the headers and the namespace 396', 397', and 398' are shown as not depending from each other. On the other side, the relationship between the class and the namespace, as well as the functions and the class, are clearly visible. This may make it easier for a user to identify the syntax of the program. As can be seen, the lines where the corresponding items of the program code 300 can be found were omitted in this exemplary illustration. Many other illustrations of the data structure 301 can be thought of.

Figure 4:
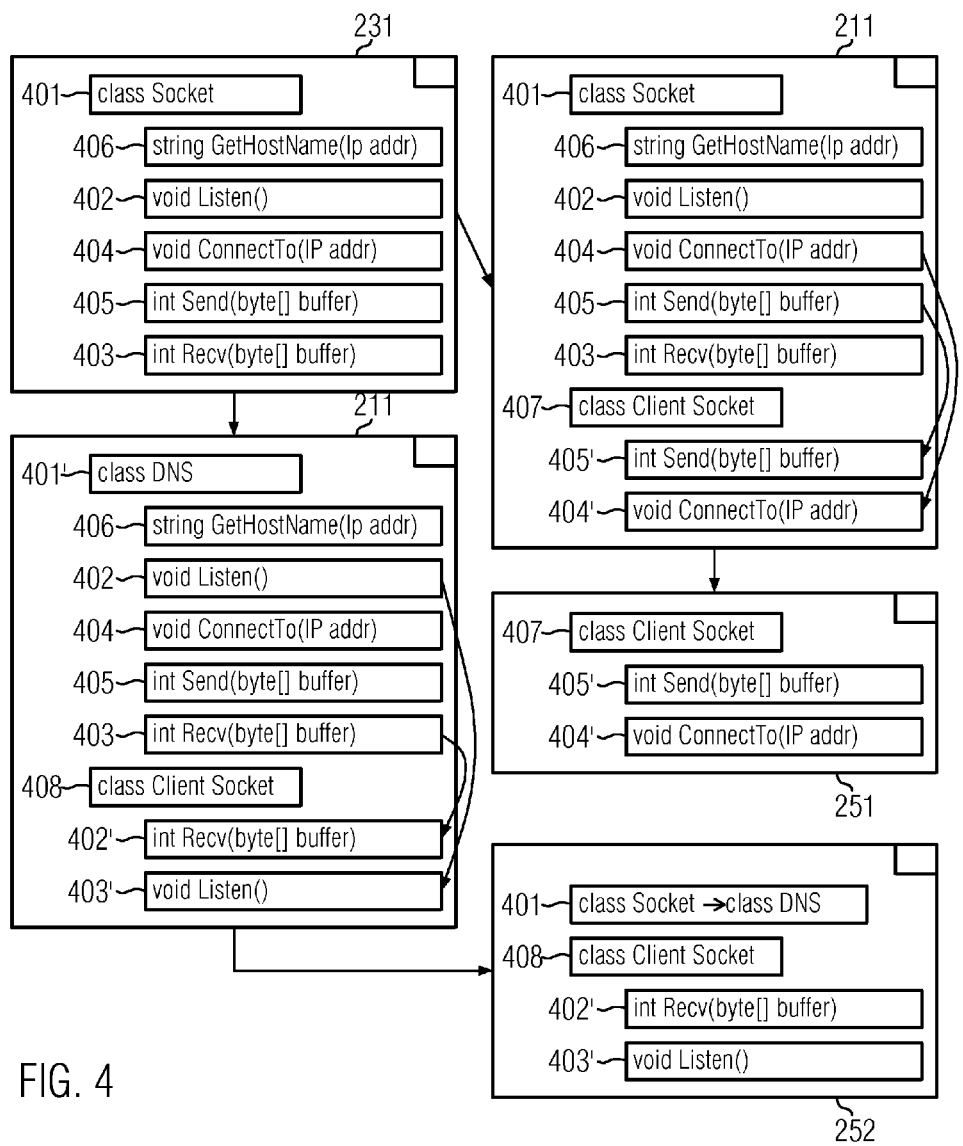
FIG. 4 is a depiction of the generation of the data structure differences according to one embodiment of the invention

FIG. 4 describes, in a more detailed way, how determining 282 the differences between the data structure 231 of the program code and the data structure 211 of the first modified program code and the data structure 221 of the second modified program code, respectively, is achieved. Exemplarily, the data structure 231 is provided that corresponds to the original program code and includes the class socket 401. Further, this class includes five functions 402-406, having the respective names. The first modified data structure 211 comprises the same class Socket 401 comprising the same functions 402-406 and, moreover, comprises another class ClientSocket that includes functions 404' and 405' that correspond to the functions of the class Socket 401 in the data structure 231, respectively. The data structure 221 comprises a class DNS 401' that includes all functions included in the class Socket 401 of the data structure 231. Furthermore, the data structure 221 includes a class called ServerSocket 408 that includes functions 402' and 403' corresponding to the functions 402 and 403 of the class DNS. As can be seen, these functions are the same as in the class socket 401 of data structure 231.

The algorithm for determining the differences between the data structure 231 and the data structure 211 and the difference between data structure 231 and data structure 221, respectively, will therefore identify as differences:

data structure 211 differs from data structure 231 in that an additional class called ClientSocket 407 is provided that includes the functions 404' and 405'.

it may also be possible that the generated difference data structure 251 includes information that the functions 404' and 405' correspond to the functions 404 and 405 of the data structure 211 and were, therefore, copied, or that they correspond to the functions 404 and 405 of the data structure 231. Furthermore, an information that the order of these functions 404 and 405 was shifted in the new class may be included in the first data structure difference 251.

The obtained data structure difference 252, resulting from the comparison of the data structure 231 and the data structure 221 will, hence, include information on the change of:

the name of the class Socket 401 of the data structure 231 being changed to DNS 401' in the data structure 221. Further, an information on the newly provided class called ServerSocket 408, and the included functions 402' and 403', will be provided in the data structure difference 252. Moreover, as already indicated for the first modified data structure 251, additional information on the newly provided class ServerSocket 408 and the included functions 402' and 403' as mirroring the functions 402 and 403 of the class DNS or the class Socket, respectively, may be included.

With the obtained data structure differences 251 and 252, the final program code 104 may be generated.

FIG. 5 shows two different realizations of the merging process 283 described in FIG. 2.

Figure 5A:
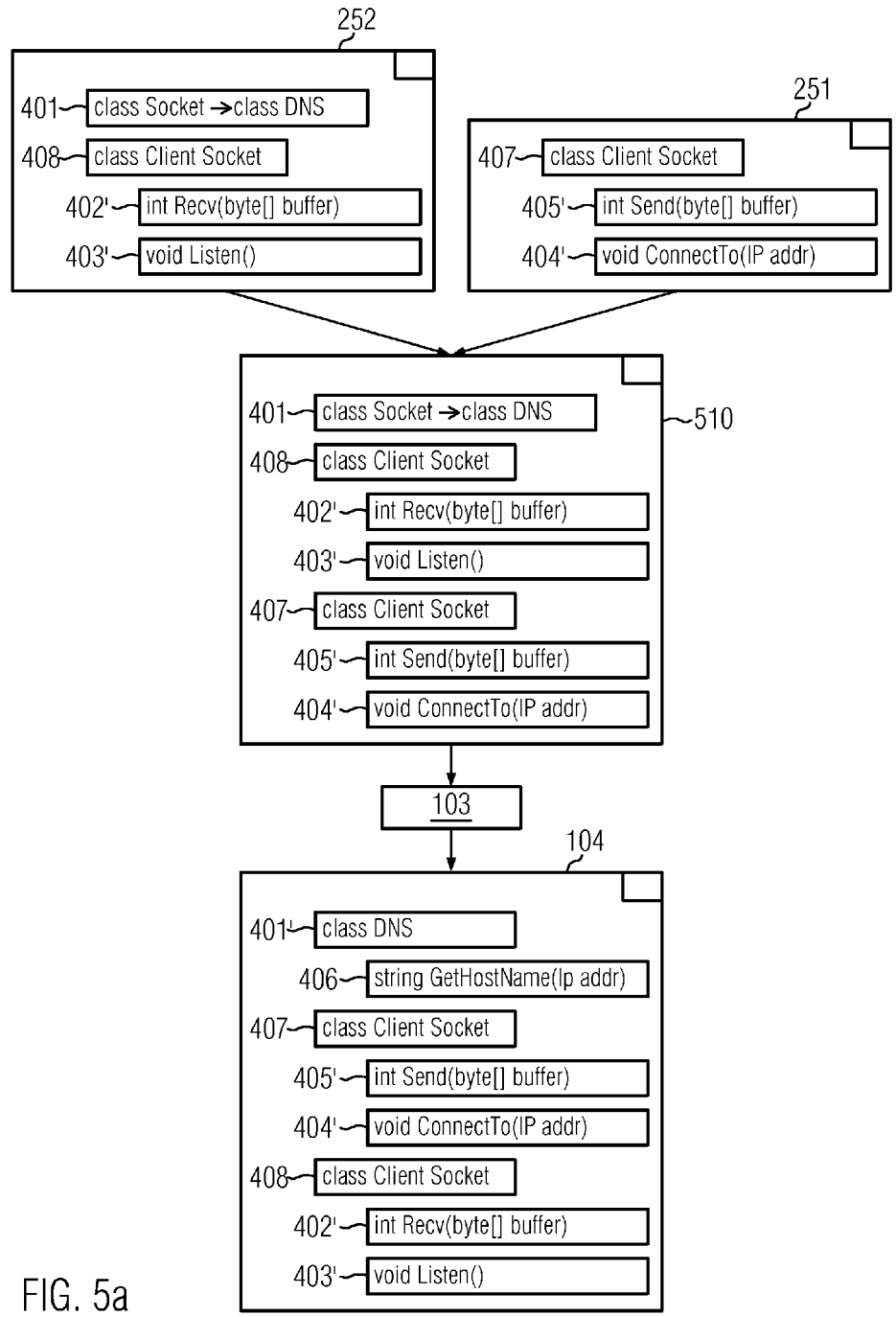
FIGS. 5a and 5b are depictions of the generation of a final program code according to embodiments of the invention.

As can be seen in FIG. 5a, the data structure differences 251 and 252, as described in FIG. 4, can be used to generate a merged difference data structure 510. This data structure 251 includes the items of the first data structure difference 251 and the second data structure difference 252, as long as no conflicts between modified items occur. In case the merging algorithm may identify conflicts that occur between one or more items $A_i$ in the first data structure difference 251 and items $B_j$ in the second data structure differences 252, those items $A_i$ may be excluded from the merged difference data structure 510 or may be indicated in any other way as causing conflicts when applying them to the program code 103. By applying the merged difference data structure 510 to the program code 103, a final program code 104 is generated. As can be seen in the depicted program code, belonging to the final program code 104, the original class named Socket 401 of FIG. 4 was renamed according to the change applied to this class in the second modified program code, such that the class is now named DNS. Moreover, the additional classes ServerSocket 408 and ClientSocket 407 were included together with their respective functions 404' and 405', as well as 402' and 403'. Although the original class Socket, now renamed DNS, could include all of the original functions, the programming language dependent merging procedure advantageously allows for avoiding the same code being duplicated. Therefore, the functions 402-405 that were originally included in the class Socket 401 of FIG. 4 are, in this embodiment, cancelled from the new class DNS since the classes ServerSocket 408 and ClientSocket 407 already include these functions. Therefore, calling for these functions in the class DNS can be avoided by deleting these functions from the class DNS in the final program code 104. As can be seen, the changes applied to the original program resulted in a program code having a different syntax, but without any conflicts occurring.

Figure 5B:
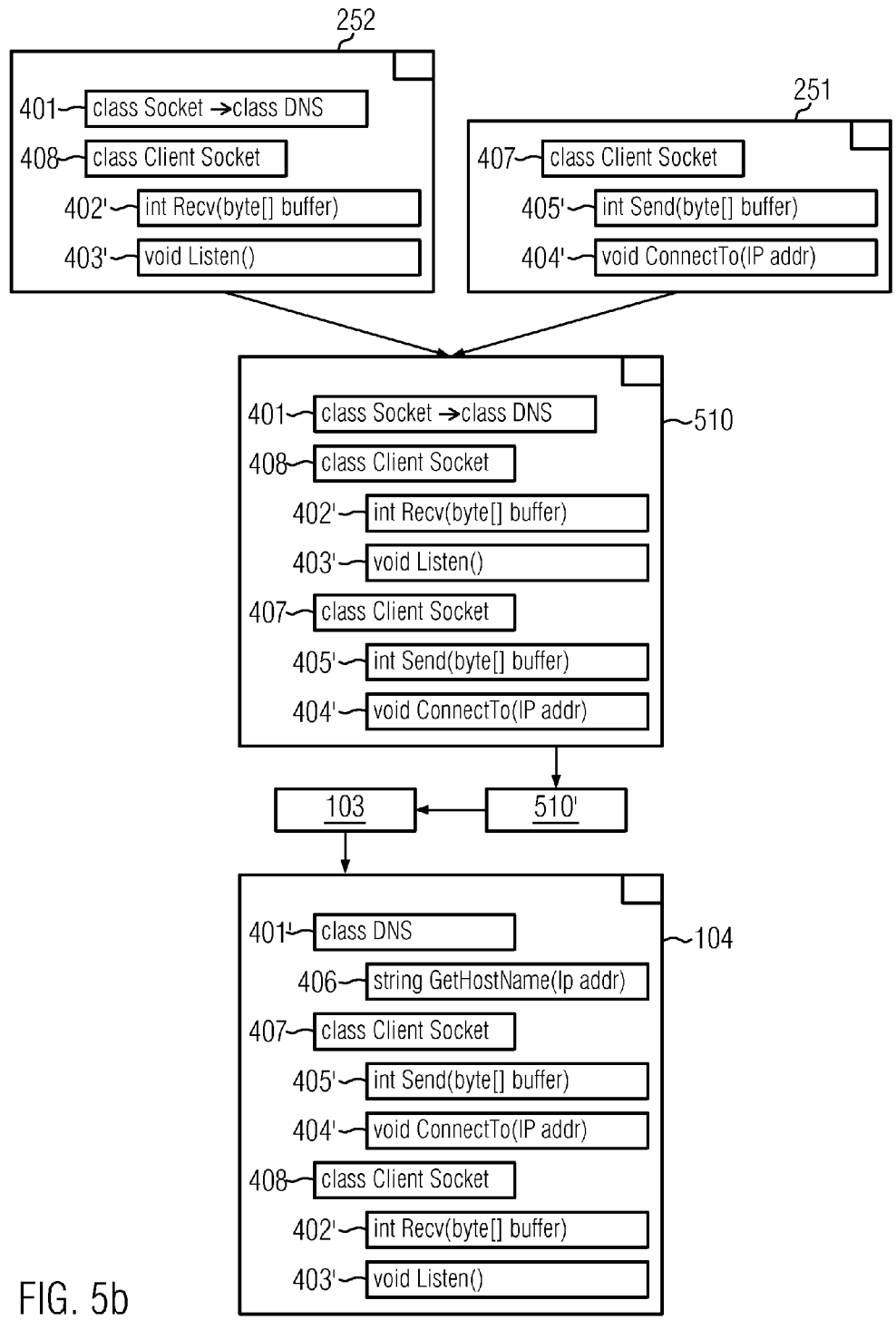

FIG. 5b depicts a further way of implementing the data structure differences 251 and 252 in the final program code. In this embodiment, the merging procedure is the same until the merged difference data structure 510 is generated. However, before including this data structure into the program code 103, a pseudo program code 510' is generated from the merged difference data structure 510. This pseudo program code 510' indeed does not correspond to a full program that would, in itself, be sufficient to be carried out on a computer in most cases. This is because the merged difference data structure 510, as described above, only includes changes that were applied to the original program data 103. This pseudo program code 510' may be provided in such a way that the merge algorithm that is used for generating the final program code 104, is informed on where to parse the pseudo program code 510'. Generating, from the merged difference data structure, a pseudo program code 510' may be advantageous since this allows a user to directly inspect the changes that will be applied to the program code 103 before the final program code 104 is generated.

As the method for merging changes applied to the first modified program code of a program code and to a second modified program code of the program code were described in the above description in a more general, abstract way, some explicit examples of the above mentioned features will be given in the following.

Considering the determination of the first data structure difference 251 and the second data structure difference 252, this is carried out in greater detail as follows. First of all, the used algorithm may or may not advantageously check whether at least one of the first and second data structure differences 251 and 252, respectively, does not include any items. In this case, no changes were made to the first modified program code 101 or the second modified program code 102, respectively, that would have an influence on the syntax of the program code 103. In case both data structure differences 251 and 252 do not contain any items, the final program code 104 will be identical to the program code 103 that was originally provided.

As in most cases this will not be the case, the algorithm may proceed by either first identifying equal items, or by identifying modified items. It may also be possible to provide an algorithm that only identifies and lists modified items within the first and second modified program codes 101 and 102, respectively, since all other items would, in that case, be the same anyway. Referring to the identification of equal items, such equal items are items of the first or second modified program code and the program code or, respectively, their corresponding data structures that were not changed in any way. This holds not only for the syntax-related properties of the items, for example the position of a function in a class or outside of a class, but also for the declaration of these items, i.e. no changes were made to the names. Having identified all the equal items, the remaining items must have been changed in some way. This holds for their position within the program code as well as their declaration. Therefore, at this step of the determination of the first and second data structure differences 251 and 252, respectively, all items in the first and second modified program code 101 and 102, that are not completely equal to the items in the program code 103, will be marked as modified.

The algorithm may then proceed by first identifying modified items that are only slightly modified compared to the original item in the program code 103. Such minor modifications, may refer to changes of the declaration of one item, while the item remains in the original position. For example, a specific function may be called function1 in the original program code 103, whereas, in the first or second modified program code, this function may have any other name that might be more suitable but the function is still provided in the same position as in the original program code 103. If only the name was changed, this will not have any influence on the syntax of the complete program, as long as this is done completely for the whole program code. Another example of such a minor modification would be shifting of a function within its original scope. This means, for example, a function defined within a class may be shifted from the beginning of a class to the end of a class, as described in FIG. 1. Although such shifting of functions without leaving the scope has no influence on the syntax of the program code, such rearrangement may, at first, be considered as modification.

Having determined the equal items and the items being only slightly modified, the algorithm may then proceed to find moves of items out of their original scope. As an example, the original program code 103 could include the following:

```
function1 (int a, int b)
{return a + b}
class1
{
function 2 (int c, int d)
{return c * d}
}
```

One of the modified program codes 101 and 102, respectively, may include the following:

```
function1 (int a, int b)
{return a+b}
function2 (int c, int d)
{return c * d}
class 1
{
}
```

In this case, function2 was moved, in the modified program code, out of its original scope, i.e. out of class1. This will have an influence on the syntax of the resulting program code. The algorithm may further indicate items in the original program code 103 that were deleted in one of the modified program codes 101 and 102 as modified items.

Referring now to the algorithm that facilitates the merging in order to generate a final program code 104. As the merge algorithm is provided with the first and second data structure differences 251 and 252, respectively, the merged algorithm is aware of the item $Y_m'$ and $Z_k'$ that were changed with respect to the original program code 103 in either of the modified program codes 101 and 201. Although it is possible to straight forward apply the modified items, and therefore the first and second data structure differences 251 and 252 to the program code 103, further processing the first and second data structure differences 251 and 252 may be advantageous. Such further processing may focus on identifying conflicts that originate from simultaneously applying the items $Y_m'$ and $Z_k'$ to the program code 103. Therefore, the merge algorithm may identify specific conflicts that can occur when merging the first and second data structure differences 251 and 252 with the program code 103. Some of these conflicts are cyclic moves, name related conflicts, item conflicts, or conflicts that are related to change/delete operations. The merge algorithm does not have to identify these conflicts in a specific order. Any order might be suitable. Further, in view of accelerating the merging process, parallelization may be advantageous, such that identifying two or more different types of the above mentioned conflicts may be carried out at the same time.

As to the conflicts, the following should be noted.

A conflict related to cyclic moves of items is a conflict that arises from at least two move operations that move items in the original program code 103 to another position in the first and second modified program code 101 and 102, respectively. In case both changes, i.e. the change in the first modified program code that was applied to the program code 103, and in the second modified program code 102 that was applied to the program code 103, are included in the final program code 104, a cycle may be created through which the final program would run over and over again. As an example, the original program code 103 may comprise the items

```
class socket
{
class utilities
{ }
}
class DNS
{ }
```

In this case, the class Socket comprises a further class called Utilities. Moreover, another class DNS is included in this program code that is outside of the class Socket.

A first modified program code could comprise the following program code that originates from moving the items of the original program code 103:

```
class DNS
{
class socket
{
class utilities
{ }
}
}
``` whereas the second modified program code may include the following:

```
class socket
{
class utilities
{
class DNS
{ }
}
}
```

In case, besides the original program code 103, the changes made in program codes 101 and 102 would be applied in the final program code, this would ultimately result in a conflict because of the created cycle. The merge algorithm may therefore identify such modifications and identify the corresponding items and delete them from the items to be applied to the program code 103 in order to generate the final program code.

The name related conflicts mentioned above may refer to a plurality of conflicts that can arise from adding different items with identical names within one and the same scope of a program code. Examples for such name related conflicts are two items having the same signature, i.e. name, and being added inside the same scope.

A specific example would be adding two functions having the same name in one and the same class.

```
class1
{
function1 (int a, int b)
{
}
function1 (int a, int c)
{
}
}
```

Another name related conflict arises when two items, having identical names but being originally placed in two different scopes, for example in two different classes, are moved such that they are now in the same scope. Such conflicts may also arise in case two items that are placed in the same scope of the original program code 103 but are named differently, are renamed such that they now have the same name and, respectively, signature. The merge algorithm can identify such name related conflict since it identifies conflicts depending on the syntax of the program code. Therefore, it will not identify two items having the same name or signature but being placed in different scopes as causing a conflict, since this is, in fact, not causing any conflicts in most programming languages, such as C++ and Fortran. However, the merging algorithm will raise a conflict if two items have the same signature within the same scope. Here, a major difference between commonly known text recognition and the programming language dependent, and therefore syntax dependent, merging of program codes of the present invention becomes visible. Whereas usual text comparison programs would identify two items having identical names or signatures as "conflict" in every case, this is actually only a conflict if these two items are in the same scope which usual text comparison programs will not consider anyway. Therefore, the programming language dependent merging of the data structure differences 251 and 252, according to the invention, only considers different items having the same signature if they are in the same scope of the resulting program.

Another important conflict can arise if, in the first modified program code, an item was deleted, whereas the same item was only modified in the second modified program code 102 with respect to the original program code 103, or vice versa. Although, in a straight forward approach, this may result in the corresponding item not being deleted but instead being replaced with the modified item of the first or second modified program code 101 and 102, respectively, this may raise conflicts. For example, in view of the modifications applied to the first modified program code with respect to the original program code 103, deleting the item in question might have been necessary in order to avoid conflict. If, in order to generate the final program code 104, this item is again included in the program code in the modified form according to the second modified program code 102, this may raise the very same conflict that was avoided in the first modified program code by deleting this item. Hence, It is advantageous if the merge algorithm is able to identify such items that were modified in one of the modified program codes but deleted in the other one. It may be advantageous in such cases that the decision on whether to replace the item in question with the modified item or to delete it is redirected to a user.

In view of the above conflicts, in order to allow the merge algorithm to identify conflicts, it might be advantageous to also provide heuristics to the merge algorithm that allow for identifying conflicts, especially with respect to conflicts that will result from modified items in a first modified program code and deleted items in the second modified program code based on probabilities that are related to the specific item (for example the type of the item such as classes, functions, or variables) and that are provided by analyzing previously modified programs. For example, if specific types of items, such as classes, pass through modifications in the first and second modified program codes that often result in these items being deleted in one of the modified program codes but being only modified in the other modified program code, and if this conflict is solved by almost every time deleting this item, the merge algorithm may automatically decide to delete the item instead of applying the modified item.

It should be noted that, although the merge algorithm is intended to work automatically, it might be advantageous to allow a user to have influence on this merging procedure at any step. For example, when the conflicts are considered and corresponding solutions are provided, allowing the user to solve conflicts on his own might be advantageous, although the solution provided by the user may be completely different to that which would have been applied based on the merging algorithm.

Figure 6:
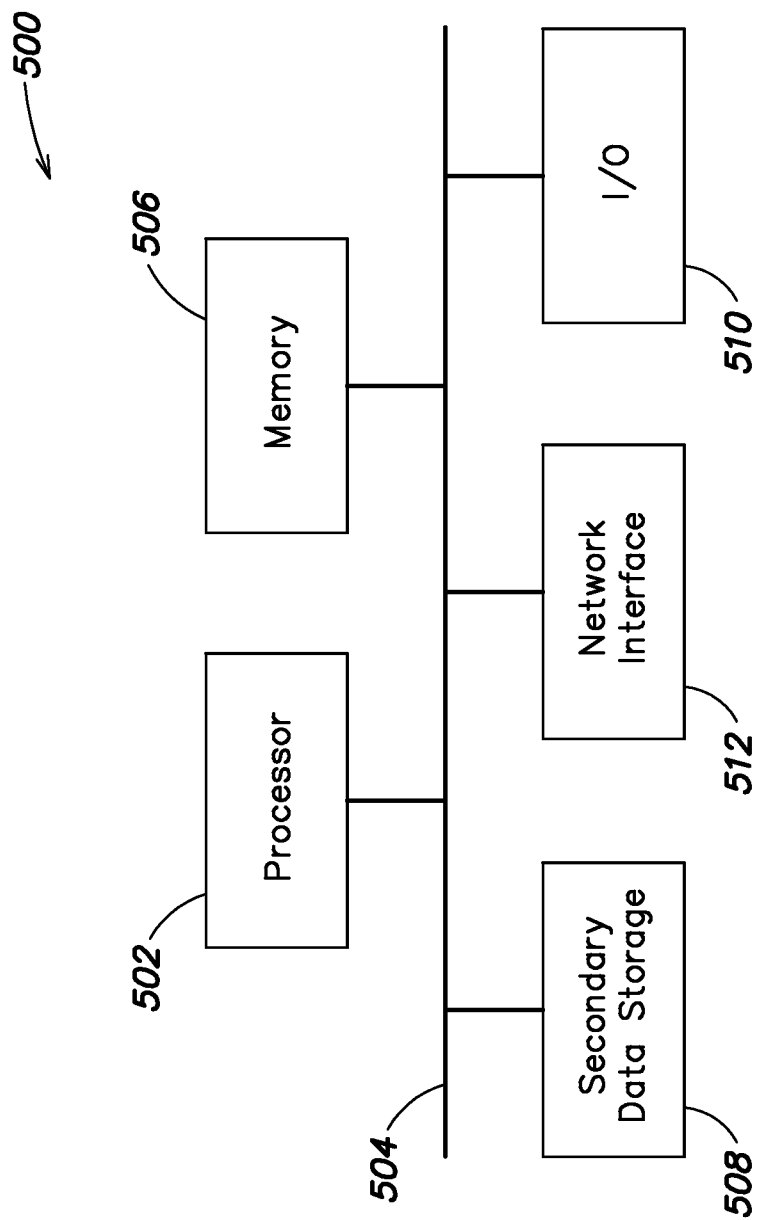
FIG. 6 illustrates a computer system, according to an embodiment.

FIG. 6 shows a computer system 500 that may be used with the embodiments described herein. The computer system 500 represents a generic platform that includes components that may be in a server or another computer system. The computer system 500 may be used as a platform for the present invention. The computer system 500 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 500 includes a processor 502 that may implement or execute machine readable instructions performing some or all of the methods, functions and other processes described herein. Commands and data from the processor 502 are communicated over a communication bus 504. The computer system 500 also includes a main memory 506, such as a random access memory (RAM), where the machine readable instructions and data for the processor 502 may reside during runtime, and a secondary data storage 508, which may be non-volatile and stores machine readable instructions and data. The memory and data storage are examples of computer readable mediums.

The computer system 500 may include an I/O device 510, such as a keyboard, a mouse, a display, etc. The computer system 500 may include a network interface 512 for connecting to a network. Other known electronic components may be added or substituted in the computer system 500.

A parser may be used to analyze text, made of a sequence of tokens (e.g., words), to determine its grammatical structure with respect to a given formal grammar. The parser may be provided at a front end of a compiler. A compiler, as is conventionally known, transforms source code, which may be written in a high-level programming language, into another computer language, such as assembly or some other low-level computer language.

While the embodiments have been described with reference to examples, various modifications to the described embodiments may be made without departing from the scope.

What is claimed is:

1. Method executed by a computer system for automatically merging changes applied to a first modified program code of a program code and to a second modified program code of the program code, both modified program codes being electronically coded and comprising one or more items, the items being items of a specific programming language;

the method comprising the steps of:
determining from each of the program code, the first modified program code and the second modified program code a respective data structure by programming language dependent parsing of the program code, the first modified program code and the second modified program code, thereby obtaining a syntax information of the program code and the first and second modified program codes;

determining a first data structure difference between the data structure of the program code and the data structure of the first modified program code by comparing items $X_i$ in the data structure of the program code with items $Y_j$ in the data structure of the first modified program code and identifying items $Y_m'$ for which no equivalent in the data structure of the program code can be identified, the first data structure difference comprising the items $Y_m'$;

determining a second data structure difference between the data structure of the program code and the data structure of the second modified program code by comparing items $X_i$ in the data structure of the program code with items $Z_j$ in the data structure of the second modified program code and identifying items $Z_k'$ for which no equivalent in the data structure of the program code can be identified, the second data structure difference comprising the items $Z_k'$;

identifying cyclic moves of at least one item of the program code in the first and second modified program codes by evaluating the syntax information of the program code and the first and second modified program codes, a cyclic move being a conflict arising from at least two move operations moving the item in the program code to different positions in each of the first and second modified program codes that result, if included in a final program code, in a cycle;

identifying name related conflicts by evaluating the syntax information of the program code and the first and second modified program codes, wherein two different items having a same name and being within a same scope are considered to cause a conflict if included in a final program code, and wherein two different items having the same name but being placed in different scopes are not considered to cause a conflict;

generating, from the first and second data structure differences, a merged difference data structure, wherein generating the merged difference data structure comprises merging the first data structure difference and the second data structure difference; and generating a final program code by including at least one of the items $Y_m'$ and/or $Z_k'$ in the program code by applying the merged difference data structure to the program code, wherein generating the final program code comprises applying pseudo program code corresponding to the merged difference structure to the program code.

2. Method according to claim 1, wherein at least one of the items of a specific programming language is a function.

3. Method according to claim 1, wherein incorporating the pseudo program code is carried out in accordance with the syntax information.

4. Method according to claim 1, further comprising the step of outputting information on at least one of added items, moved items, deleted items and modified items of the first and second modified program code compared to the program code.

5. Method according to claim 2, wherein determining the data structures comprises handling a source code of the functions as text.

6. Method according to claim 5, wherein determining the data structures comprises excluding the source code of the functions from the data structures.

7. Method according to claim 1, wherein the first or second modified program code include items $J_i$ that have no equivalent in the program code.

8. Method according to claim 1, wherein generating the final program code comprises applying semantic heuristics depending on the programming language to which the program code and the first and second modified program codes correspond and the items included in the program code and the first and second modified program codes.

9. Method according to claim 1, wherein the data structures further comprise information on the position of items of the program code and the first and second modified program code respectively.

10. Method according to claim 1, where incorporating the pseudo program code is carried out in accordance with the syntax information.

11. Method according to claim 1, wherein generating the merged data structure further comprises excluding the cyclic moves and the name related conflicts from the merged data structure.

12. Method according to claim 4, wherein at least one of the items of a specific programming language is a function.

13. Method according to claim 4, wherein incorporating the pseudo program code is carried out in accordance with the syntax information.

14. Method according to claim 4, wherein generating the merged data structure further comprises excluding the cyclic moves and the name related conflicts from the merged data structure.

15. Method according to claim 4, wherein determining the data structures comprises excluding the source code of the functions from the data structures.

16. Method according to claim 7, wherein at least one of the items of a specific programming language is a function.

17. Method according to claim 7, wherein incorporating the pseudo program code is carried out in accordance with the syntax information.

18. Method according to claim 7, wherein generating the merged data structure further comprises excluding the cyclic moves and the name related conflicts from the merged data structure.

19. Method according to claim 7, wherein determining the data structures comprises excluding the source code of the functions from the data structures.

20. Method according to claim 8, wherein at least one of the items of a specific programming language is a function.

21. Method according to claim 8, wherein incorporating the pseudo program code is carried out in accordance with the syntax information.

22. Method according to claim 8, wherein generating the merged data structure further comprises excluding the cyclic moves and the name related conflicts from the merged data structure.

23. Method according to claim 8, wherein determining the data structures comprises excluding the source code of the functions from the data structures.

* * * * *